US010941676B2

(12) United States Patent
Pfab et al.

(10) Patent No.: US 10,941,676 B2
(45) Date of Patent: Mar. 9, 2021

(54) METHOD FOR ADAPTING THE OUTPUT OF A STEAM-TURBINE POWER STATION, AND STEAM-TURBINE POWER STATION

(71) Applicant: Carbon-Clean Technologies GmbH, Cologne (DE)

(72) Inventors: Robert Joseph Pfab, Cologne (DE); Lars Zoellner, Cologne (DE); Klaus Knop, Sulzburg (DE)

(73) Assignee: Carbon-Clean Technologies GmbH, Cologne (DE)

( * ) Notice: Subject to any disclaimer, the term of this patent is extended or adjusted under 35 U.S.C. 154(b) by 207 days.

(21) Appl. No.: 16/317,785

(22) PCT Filed: Jun. 21, 2017

(86) PCT No.: PCT/EP2017/025177
§ 371 (c)(1),
(2) Date: Aug. 6, 2019

(87) PCT Pub. No.: WO2018/010848
PCT Pub. Date: Jan. 18, 2018

(65) Prior Publication Data
US 2020/0182093 A1    Jun. 11, 2020

(30) Foreign Application Priority Data

Jul. 15, 2016 (DE) .................. 10 2016 008 520.7
Oct. 10, 2016 (EP) .................. 16020391
Dec. 22, 2016 (EP) .................. 16020509

(51) Int. Cl.
*F01K 13/02* (2006.01)
*F01K 3/06* (2006.01)
(Continued)

(52) U.S. Cl.
CPC .............. *F01K 13/02* (2013.01); *F01K 3/06* (2013.01); *F01K 7/44* (2013.01); *H02J 3/28* (2013.01)

(58) Field of Classification Search
CPC ..... F01K 3/06; F01K 3/14; F01K 3/16; F01K 3/186; F01K 7/34; F01K 7/40; F01K 7/44;
(Continued)

(56) References Cited

U.S. PATENT DOCUMENTS 6,101,983 A * 8/2000 Anand .................. F01K 23/062
122/4 D
8,987,931 B2    3/2015 Marley
(Continued)

FOREIGN PATENT DOCUMENTS

DE    102011100517 A1    11/2012
DE    102014201406 B3    12/2014
(Continued)

OTHER PUBLICATIONS

International Search Report for PCT/EP2017/025177 dated Nov. 16, 2017, 7 pages.
(Continued)

*Primary Examiner* — Mark A Laurenzi
*Assistant Examiner* — Mickey H France
(74) *Attorney, Agent, or Firm* — FisherBroyles, LLP; Craig W. Mueller (57) ABSTRACT

Disclosed is a method for rapidly and flexibly adapting the output of a steam-turbine power station (1), preferably for adapting the output to altered network loads, more preferably for providing a positive and/or negative network operating reserve as required, and especially preferably for providing a primary operating reserve and/or a secondary operating reserve. According to the invention, heat released
(Continued)

during the discharge of at least one electrically chargeable thermal store (6) is coupled into a feedwater heater section (3) of the power station (1).

16 Claims, 6 Drawing Sheets

(51) Int. Cl.
*F01K 7/44* (2006.01)
*H02J 3/28* (2006.01)

(58) Field of Classification Search
CPC ........ F01K 13/006; F01K 13/02; F01K 13/12; F01K 23/10; F01K 7/22; F01K 7/16; F28D 20/00; F28D 2020/0047
USPC ......... 60/645, 646, 652, 654, 656, 659, 662, 60/664, 667, 676
See application file for complete search history.

(56) References Cited

U.S. PATENT DOCUMENTS

| | | | | |
|---|---|---|---|---|
| 2001/0027642 A1* | 10/2001 | Tsuji | ........................ | F01K 23/10 60/39.182 |
| 2002/0023423 A1* | 2/2002 | Viteri | ........................ | F02C 1/08 60/772 |
| 2010/0083666 A1* | 4/2010 | Brook | ..................... | C01B 3/382 60/780 |
| 2010/0281870 A1* | 11/2010 | Holt | ........................ | F02C 7/224 60/736 |
| 2011/0005225 A1* | 1/2011 | Namba | .................. | F01K 17/005 60/645 |
| 2011/0083443 A1* | 4/2011 | Jockenhoevel | ......... | F01D 15/00 60/772 |
| 2011/0167783 A1* | 7/2011 | Tanabe | ....................... | F02C 3/30 60/39.461 |
| 2014/0020383 A1* | 1/2014 | Yoshida | .................. | F03G 6/005 60/641.8 |
| 2014/0090378 A1* | 4/2014 | Dengel | ..................... | F01K 3/12 60/652 |
| 2014/0298813 A1* | 10/2014 | Brunhuber | .............. | F01K 3/006 60/645 |
| 2014/0338330 A1* | 11/2014 | Brunhuber | ................ | F01K 3/00 60/659 |
| 2015/0027122 A1* | 1/2015 | Brunhuber | ................ | F01K 7/22 60/659 |
| 2017/0241296 A1* | 8/2017 | Knop | ........................ | F01K 3/18 |
| 2018/0171827 A1* | 6/2018 | Skowronski | ............... | F01K 7/38 |
| 2020/0182093 A1* | 6/2020 | Joseph | ....................... | H02J 3/28 |

FOREIGN PATENT DOCUMENTS

| | | |
|---|---|---|
| DE | 102014017346 A1 | 4/2016 |
| EP | 2101051 A1 | 9/2009 |
| WO | 2013135718 A1 | 9/2013 |

OTHER PUBLICATIONS

Written Opinion for PCT/EP2017/025177 dated Nov. 16, 2017, 5 pages.

* cited by examiner

METHOD FOR ADAPTING THE OUTPUT OF A STEAM-TURBINE POWER STATION, AND STEAM-TURBINE POWER STATION

This application is the National Phase of PCT Application No. PCT/EP2017/025177, filed Jun. 21, 2017, which claims the benefit of German Patent Application Serial No. 102016008520.7, filed Jul. 15, 2016, and European Patent Application Serial Nos. 16020391.5 and 16020509.2, filed Oct. 10, 2016 and Dec. 22, 2016, respectively, the entire disclosures of which are incorporated by reference herein.

FIELD OF THE INVENTION

The invention relates to a method for rapidly and flexibly adapting the output of a steam turbine power plant, preferably for output adaptation to changed network loads, further preferably for providing control power output depending on demand, particularly preferably for providing primary and/or secondary control power output. The invention further relates to a steam turbine power plant comprising at least one steam turbine and further required plant components for the power plant process, such as feed water preheaters, evaporators, steam superheaters, pump and condenser, and feedwater tanks. The invention particularly and preferably relates to a pulverized coal-fired power plant of the power class greater than 50 $MW_{el}$, particularly preferably greater than 100 $MW_{el}$, for example, greater than 400 $MW_{el}$.

BACKGROUND AND SUMMARY OF THE INVENTION

A flexible load operation of the power plants connected to the power grid is gaining in importance due to the deregulation of the electricity market. Added to this is the removal of regenerative energies, such as, for example, the wind energy, which leads to higher demands on the ability to adapt the power of different types of power plants. As a result of the rising feeding of regenerative energy into the power grid, conventional power generation plants are increasingly forced into a load regime, which is characterized by many load changes. If the grid load, that is to say the total power consumption in a interconnected grid, increases in an unpredictable manner, that is to say the instantaneously fed-in power of all power stations increases, this leads to a slight braking of the generators and thus to a decrease in the network frequency. The same occurs if the feed rate decreases unexpectedly, for example due to the failure of a power plant. Conversely, the network frequency increases, when the feed is higher than expected or if the load is lower. In order to keep the network frequency sufficiently stable, an active control is necessary, to be precise with different contributions according to certain time periods. Control energy is required for this regulation, namely in the event of a network frequency, which is too low, additional feeds into the power network or a reduction of the network load, which is in each case referred to as a "positive control power" or "positive control energy". If the grid frequency is too high, the feed must be reduced or the grid load must be increased, which is referred to as the "negative control power" or "negative control energy".

With regard to the frequency regulation in current networks, a distinction is made between a primary and a secondary control. The primary control usually has to intervene when a frequency deviation of at least 0.02 Hz occurs. A power change then has to take place proportional to the deviation of the grid frequency within 30 seconds, which if necessary, has to be maintained over 15 minutes. The so-called "secondary control", on the other hand, takes place at the level of the transmission networks and reacts significantly more slowly. The secondary control must be used within a maximum of 15 minutes.

Frequency deviations are first divided by the primary control into the power stations involved in the primary control in the entire power grid. These provide a so-called primary control reserve, which is a power reserve, for this purpose, which is automatically delivered to the power grid by the power stations involved. The primary control serves to stabilize the grid frequency with the smallest possible deviation, but at a level deviating from a predetermined grid frequency nominal value. The secondary control following the primary control, on the other hand, has the task to re-establish the equilibrium between the current generators and consumers in the power grid and thereby return the grid frequency back to the predetermined grid frequency nominal value. For this purpose, power stations involved in the secondary control provide a secondary control reserve.

It is known that an effective power increase, for example, of a coal-fired power plant from any one power point takes longer than, for example, in the case of pumped storage or gas power stations, in which the power can be called up in the second range as required. A change in the coal firing only leads after a delay in the minute range to a change in the effective power delivered into the power grids or the electrical net power of the power plant, so that the power ramps that can be achieved thereby are moderate. Power increases can thus only be delivered to the corresponding distribution networks in a time-delayed manner. The same applies to a reduction of the power delivered into the distribution networks.

If it is necessary to provide a rapid power change, fast-acting additional measures are required. Examples of such measures are the throttling of the high-pressure turbine control valves, an introduction of overload to the high-pressure turbine part, the condensate build-up or also the throttling of the tapping steam lines to high-pressure preheaters in the preheating section of the feedwater.

Thus, for example, a build-up of condensate is carried out for a short time, quickly and temporarily, to make more steam available in the low-pressure or medium-pressure part of the turbine. The prerequisite is, however, that the steam generator is operated sufficiently far below the maximum steam generator power. If required, the condensate mass flow through the low-pressure preheating section is reduced and thus also the extraction steam mass flow from low-pressure and medium-pressure preheaters, as a result of which more steam remains in the turbine and thereby more power is generated. The reduction of the condensate mass flow is necessary, so that the water temperature in the feed water container does not change and, as a result, no return effects on the steam generation result. The additional condensate is stored. Due to the restricted volumes of these condensate reservoirs, however, the condensate accumulation is limited to a few minutes. The firing rate of the steam generator must therefore be increased in parallel with the condensate accumulation, in order to satisfy the increased power requirement for a longer period of time and to remove the condensate build-up in the minute range. Since the feed-water tank is only supplied with a reduced condensate mass flow, the filling level falls correspondingly. With increasing steam generator output, the throttling of the condensate control station can be reduced again until a stationary operating state is finally achieved. In order to restore the original state, the stored condensate must be conveyed back into the feed-water container. In this way, the multiple output of the power plant, which can be made available for a short time by the condensate accumulation, is limited by the maximum steam generator output, since the steam generator has to remove the condensate build-up in a short time.

During the throttling of the extraction steam lines to the high-pressure preheaters in the feed-water preheating section, high thermal load of the preheater occur, wherein colder feed water is supplied to the steam generator in this case, so that the boiler furnace must be correspondingly over-dimensioned.

The accumulation of condensate and the known throttling method result in the operation of the power plant with reduced efficiency.

Against this background, the invention is based on the object to provide a method for adapting the power output of a steam turbine power plant and to a steam turbine power plant, which enable a quick and flexible increase or decrease in the effective power of the power plant with high efficiency of power generation and in a simple manner in terms of the method. In particular, power plant operators are to be able to open up new options for economic power plant operation by means of the method according to the invention and the steam turbine power plant according to the invention.

The aforementioned object is achieved by a method having the features of claim 1 and by a steam turbine power plant having the features of claim 14. Preferred embodiments of the invention are the subject matter of the dependent claims.

According to the invention, the effective power of the power plant is increased quickly and flexibly, preferably for providing positive network control power, particularly preferably for providing primary and/or secondary control power, a heat coupling of heat released during the discharge of at least one electrically loadable thermal accumulator into a feed-water preheating section of the power plant is provided. In the context of the invention, the term "electrical net power output of the power plant" or "active power output" is understood to mean the power supplied by the power plant to the power grid, in particular electric power supplied to a power interconnected grid. The accumulator is charged by supplying electrical energy, which is converted into thermal energy at a high temperature level and stored. The heat introduction during the discharge of the accumulator can be achieved in the region of a high-pressure and/or low-pressure preheating section of the steam turbine power plant. The heat introduction preferably takes place via a heat carrier, in particular hot air.

The coupling of the power plant process, which is proposed according to the invention, with a storage concept, which provides at least one electrically chargeable thermal accumulator, is advantageous in particular in the case of motor vehicles, which are fired with hard coal.

The heat introduction from electrically chargeable thermal accumulators in large power plants of the power output class greater than 50 $MW_{el}$ is particularly advantageous, particularly preferably greater than 100 $MW_{el}$, for example greater than 400 $MW_{el}$.

The steam turbine power plant according to the invention has at least one steam turbine and at least one thermally chargeable thermal accumulator, wherein corresponding devices for coupling the thermal energy released during the discharge of the thermal accumulator into the feed water preheating section of the power plant are provided.

The invention provides for the use of at least one electrically chargeable thermal accumulator, in which the heat energy is stored and this is used as an independent measure or else as an additional measure, in order to increase the net electric power or the effective power of the power plant and thus, in particular, the availability of primary and/or secondary control reserves.

In comparison to the known condensate build-up method, the heat coupling proposed according to the invention from an electrically charged thermal accumulator makes it possible to increase the power of the power plant over a longer period of up to a few hours, wherein the possible time duration of the power increase depends on the storage capacity. In contrast to the known condensate build-up method, the method according to the invention, the power plant can be operated over a longer period of time even at maximum steam generation power with high control reserves. Moreover, by means of the proposed coupling of heat from the reservoir into the feed water preheating section of the power plant, an increase in the effective power can be achieved, which corresponds to the power increase which can be achieved with the known condensate build-up method, or even goes beyond and can be 10% or more. By means of a comparatively simple and cost-effective storage technology, the heat coupling provided according to the invention from a heat accumulator can also be retrofitted as an additional measure in conventionally operated power stations using the existing power plant periphery. Thus, a very cost-effective possibility is created for improving the plant dynamic of power plant plants.

The reaction time for a change in power by coupling thermal heat from the electrically heatable accumulator can be very short and can be for example between 5 and 20 seconds. In this way, a very fast possibility for adapting the effective power of the power plant is also provided.

A scaling of the thermal accumulator to a thermal storage capacity of several 100 MWh up to more than 1000 MWh is possible. The thermal power of the accumulator can be more than 50 MW, preferably more than 100 MW. In order to keep a certain storage capacity, a plurality of thermal accumulators, also of modular design, can be interconnected, depending on the requirement. The maximum storage temperature can be in the range between 1100° C. and 1300° C., preferably approximately 1200° C.

The thermal accumulator can have heating conductors, which can be supplied with current and are arranged in a bed made of a heat-storing material. While connecting the accumulator, the heating elements are supplied with current, and the heat of the heating conductors generated thereby is transferred to the bed. During the discharge, air can be passed through the hot bed in order to generate hot air, wherein a subsequent indirect heat transfer from the hot air to the feed water can take place in a correspondingly designed air/water heat exchanger. Other embodiments of electrically chargeable thermal accumulators are also possible.

In conventionally operated steam turbine power plants, extraction steam from the steam turbine is usually extracted for preheating the feed water, with which at least one feed-water preheater in the feed-water preheating section is heated. A reduction in power output of the steam turbine results from the steam extraction. By coupling the thermal energy of the accumulator into the feed-water preheating section, in particular, in the case of a positive control power requirement, a steam tapping of the steam turbine provided for preheating the feed water can be reduced or even completely stopped, so that the power plant power generated by the steam turbine and thus also the effective power of the power plant delivered to the power grid increase.

The method according to the invention can provide in this context, that the feed water, if required, for increasing the electrical power of the power plant in a bypass line by bypassing at least one feed water preheater of the preheating section, which can be heated with bleed steam from the steam turbine, lead to the accumulator and is heated in the process. The formulation "to the reservoir" is to be interpreted broadly.

The heat coupling into the feed water is preferably affected by means of a gaseous heat carrier (circuit), which flows through the accumulator and is heated in the process. Furthermore, in particular, a hot air flow is generated during the discharge of the accumulator, which supplies the absorbed thermal energy to the feed water in a heat exchanger connected downstream of the accumulator. The feed water then does not flow through the accumulator. A feed water-side bypass of a high-pressure, medium-pressure and/or low-pressure preheater in the feed-water preheating section can be provided.

It is expedient in the sense of the invention, when thermal energy of the accumulator is coupled primarily into a high-pressure region of the feed-water preheating section. This enables a throttling of an extraction steam line to a high-pressure preheater of the preheating section. Preferably, less or no energetically higher-quality extraction steam at a high-pressure level has to be removed from the high-pressure part of the steam turbine. If sufficient thermal energy of the accumulator is available, thermal energy can then also be coupled downstream into a middle- and low-pressure region of the feed-water preheating section. In terms of construction, the inventive power plant system has for this purpose a bypass for bypassing at least one feed-water preheater on a high-pressure side of the feed-water preheating system and, preferably, a bypass for bypassing at least one more feed-water preheater on one medium- or low-pressure side of the feed-water preheating.

In order to reduce the effective power of the power plant, in particular in the event of a negative control power requirement, the thermal accumulator can be charged with electrical energy generated by the power plant. At least part of the electrical power of the power plant is then not fed into the power network, but serves to load the thermal accumulator, so that the effective power of the power plant falls. In the event of a reduced power demand in the power supply system, in particular during low-load times and/or at a high network frequency, in a simple manner and due to fast loading times, the current feed can be reduced very briefly and thus the provision of negative control energy can be realized.

In addition, the thermal accumulator, in particular in the case of a negative control power requirement, can also be heated or charged with electrical energy from a power grid. By charging the accumulator with electrical energy from the power grid, the grid load can be increased in a very short time and thus negative primary and/or secondary control power can be provided.

With the possibility of thermal coupling into the feed water preheating in case of discharge of the thermal accumulator and the charging of the accumulator with current, positive and negative control power are offered can also be achieved during a nominal load operation of the power plant over a comparatively long time period, which depends, among other things, on the storage capacity. If the power plant is operated at nominal load or even in the range between nominal load and minimum load, a discharge of the thermal accumulator can take place in order to provide positive control power and the thermal accumulator can be charged to provide negative control power. An increase in power output of several percent can be achieved, in particular up to 10% or more, by coupling of stored heat into the process of feed water preheating. In a corresponding order of magnitude, the effective power of the power plant can be reduced by loading the thermal accumulator.

By lowering the working or power point, on which the power tool is operated, more positive and negative control power or a wider control band can be offered with the method according to the invention compared to a conventional power plant operation, in which the known measures for improving the system dynamics, such as condensate accumulation and throttling of the turbine control valves, are used. In the method according to the invention, the operating point of the power plant is preferably in a range of 90% to 100% of the nominal firing power of the power plant.

The use of electrically heatable thermal accumulators increases the flexibility of the power plant, enables, in particular, a rapid and flexible availability, in particular, of primary control reserves, but also of secondary control reserves, and thus ensures an economical operation of the power plant, in particular, in a changed power market. By coupling the power station process to electrically loadable thermal accumulators, in particular, the primary and secondary control capability of the power plant is improved and thus a new option is opened up for power plant operators for a high-cost power plant operation. Primary and secondary control reserves can be offered and sold as additional network services.

The minimum load of the power plant is primarily restricted by the firing and has different limiting values depending on the fuel. In coal power stations, the minimum load can be lowered to about 15% of the nominal firing power. In times of low current demand, in particular, when the current price, which can be achieved by feeding current into a power network, is below the current production costs of the power plant, in particular, in so-called "off-peak times", power stations are operated at minimum load. During a minimum load operation of the power plant, it is then usually not possible in conventional power plant concepts to provide negative control power. The method according to the invention, on the other hand, makes it possible for the accumulator to be operated at minimum load operation of the power plant, in particular at low-tariff current prices, for loading at least partially with electrical energy generated by the power plant in order to provide negative control power. During operation of the power plant at minimum load, the effective power of the power plant supplied to the power grid can thus be reduced by loading the thermal accumulator with electrical energy generated in the power plant process and thus negative control power can be provided. Negative primary and secondary control reserves can be offered and sold as additional network services, which leads to a high economic efficiency of the plant operation.

In the case of minimum load operation of the power plant, the effective power of the power plant can be adapted in a simple manner by changing the loading capacity of the accumulator, that is the amount of electricity converted into thermal energy during the loading of the accumulator, in relation to the loading time, and to the demand for grid control power. The thermal accumulator can preferably be loaded with a proportion of the electric power generated by the power plant at minimum load from zero to 100%. During low-rate times of the current price, for example, the entire electrical power of the power plant can be used for cooling the thermal accumulator. If the current demand in the power network increases, the proportion of the power plant power used for energizing the thermal accumulator can be reduced to zero, if necessary, so that the entire power plant power can be fed back completely into the power grid. As a result of the possibility for a rapid change in the loading capacity, the effective power of the power plant can be adapted flexibly and very promptly to a changed demand in the power grid.

If, for example, the generated electrical power of the power plant is 15% of the nominal power at minimum load, the thermal accumulator can be loaded in the case of a minimum load operation of the power plant, for example, with a proportion of 7.5% of the nominal power. The effective power of the power plant is reduced accordingly to 7.5% of the nominal power. By increasing the loading capacity of the thermal accumulator to 15% of the nominal power, the effective power of the power plant can be reduced to zero. It is equally possible to increase the effective power of the power plant again by reducing the loading capacity of the accumulator to a maximum of 15% of the nominal power when the loading of the thermal accumulator is stopped.

The maximum loading capacity of the accumulator can correspond to at least the power plant power at minimum load operation. The loading capacity of the thermal accumulator is thus sufficient to convert and store the entire current generated by the power plant in case of minimum load operation into heat.

The energizing of the thermal accumulator with electrical energy generated by the power plant leads to a reduction of the effective power or current feed into the power grid. In order to additionally increase the grid load and to provide further negative control power, in the event of a sufficiently large loading capacity of the thermal accumulator, the thermal accumulator can additionally be charged with electrical energy from the interconnected power grid in case of a minimum load operation of the power plant. The provision of additional control power for loading the thermal accumulator by removing current from the power grid represents a new option for a highly economical plant operation, which is not provided in the power plant concepts known from the prior art.

Otherwise, even after the power plant has been switched off, the thermal accumulator can be charged with electrical energy from the power grid, so that negative control power can also be provided in the switched-off state of the power plant.

Provision can preferably be made for the discharge of the accumulator by passing air through the hot thermal accumulator material, so that a hot air flow is generated. If the latter is at an elevated pressure level, for example, of more than 2 bar, preferably more than 3 bar, more preferably 3.5 bar or more, the hot air flow can be expanded in an expander before the heat input into the feed water preheating section, in order to generate additional electrical energy as required and thus to be able to adapt the effective power of the power plant system to the power demand in an even greater degree in a flexible manner. In addition, the overall efficiency of the power plant process can thus be increased.

BRIEF DESCRIPTION OF THE DRAWINGS

The invention is explained in the following by way of example with reference to the drawing. Identical plant components of the embodiments of the invention shown are provided with the same reference numerals. The drawing shows

| | |
|---|---|
| 1 | power plant |
| 2 | steam turbine |
| 3 | feed water preheating section |
| 4 | water-steam operating circuit |
| 5 | effective power |
| 6 | accumulator |
| 7 | power |
| 8 | air flow |
| 9 | compressor |
| 10 | expander |
| 11 | power |
| 12 | high-pressure part |
| 13 | medium- and low-pressure part |
| 14 | low-pressure preheater |
| 15 | feed water tank |
| 16 | pump |
| 17 | high-pressure preheater |
| 18 | economizer |
| 19 | feed water |
| 20 | evaporator |
| 21 | superheater |
| 22 | steam |
| 23 | intermediate heater |
| 24 | condenser |
| 25 | extraction steam |
| 26 | extraction steam |
| 27 | part flow rate |
| 28 | part flow rate |
| 29 | part flow rate flow |
| 30 | part flow rate flow |
| 31 | power curve |
| 32 | power curve |
| 33 | power curve |
| 34 | power curve |
| 35 | power increase |
| 36 | power decrease |
| 37 | power increase |
| 38 | power decrease |
| 39 | power increase |
| 40 | power decrease |

DETAILED DESCRIPTION

Figure 1:
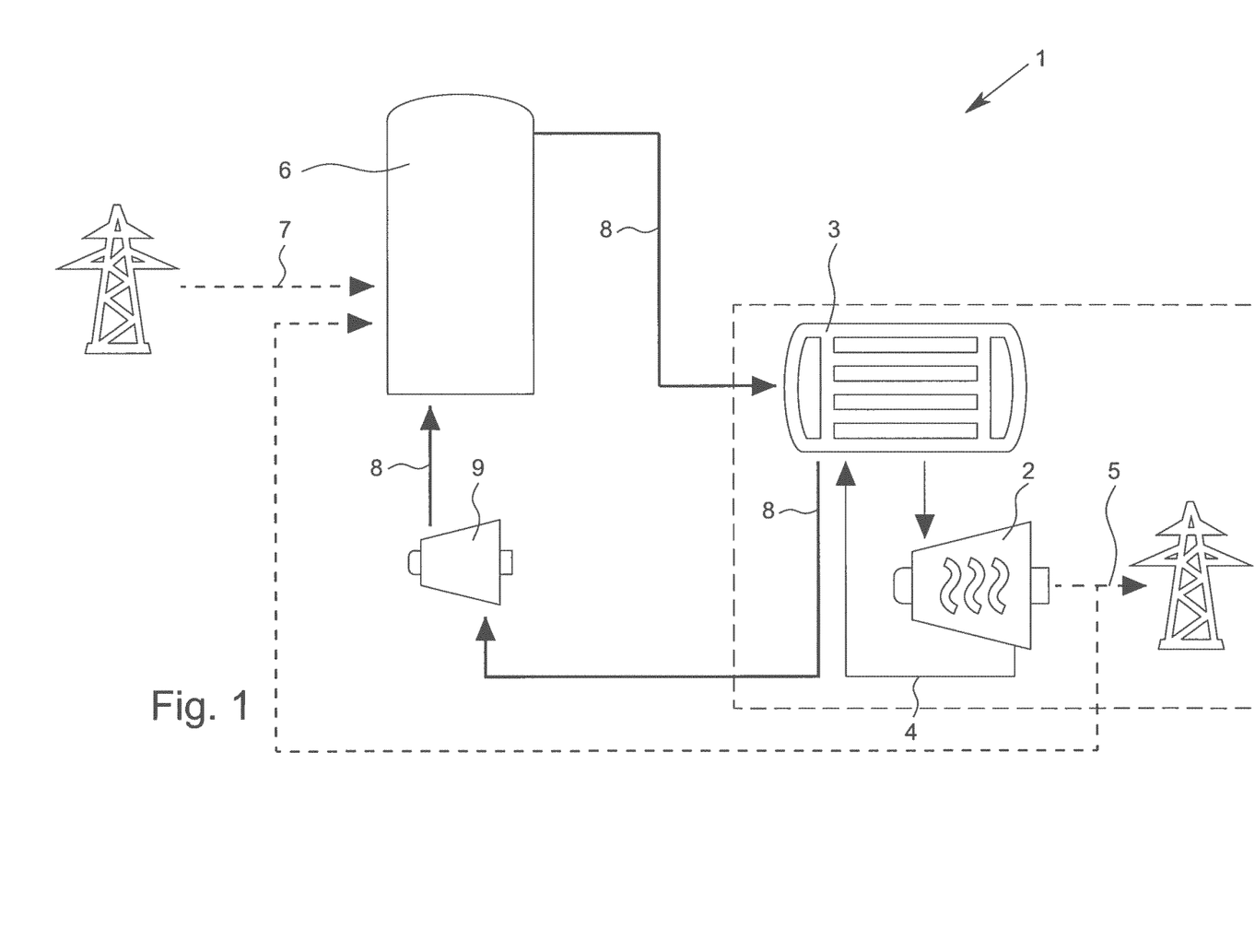
FIG. 1 is a simplified plant diagram of a steam turbine power plant according to the invention comprising an electrically chargeable thermal accumulator, wherein thermal energy released during the discharge can be coupled into a feed water pre-heating section of the power plant for pre-heating the feed water.

FIG. 1 shows a simplified plant diagram of a steam turbine power plant 1 with a schematically represented steam turbine 2, which can have a high-pressure part, a medium-pressure part and a low-pressure part. Furthermore, a feed water preheating section 3 of a water-steam working circuit 4 is shown schematically, in which feed water for the subsequent evaporation is preheated. The electrical net power or active power 5 generated in the power plant process is fed into an interconnected power grid. Further plant components required for generating power in the steam power process are not shown in FIG. 1.

For rapid and flexible adaptation of the effective power 5 of the power plant 1, further preferably for providing positive and negative grid control power, if necessary, at least one electrically loadable thermal accumulator is provided. In order to charge the accumulator 6, electrical power 7 can be removed from the interconnected power grid 7 and/or a part of the electrical energy generated by the power plant 1 is used, which leads to a decrease in the effective power 5 fed into the interconnected power grid.

The electric accumulator 6 can comprise at least one electric heating conductor for converting electrical energy into thermal energy and a heat accumulator material, in particular a bed made of a heat-storing material. The achievable accumulator temperature can be between 1000° C. and 1300° C., preferably between 1100° C. and 1200° C. In order to discharge the accumulator 6 an air flow 8 is guided through the hot heat accumulator material and in this case brought to a temperature of preferably more than 500° C., in particular, more than 700° C. The air flow 8 can be supplied to the accumulator 6 at a pressure greater than 2 bar, in particular, greater than 3 bar, for example, 3.5 bar. A compressor 9 is provided for compressing the air flow. The hot air flow 8 exiting from the accumulator 6 is used for feed water preheating. In the feed water preheating section 3, a preferably indirect heat transfer takes place from the hot air flow 8 to the liquid feed water.

As will be explained in more detail below with reference to FIG. 3, the coupling of heat energy from the accumulator 6 into the power plant process for preheating the feed water enables rapid and demand-dependent increase in the electrical power of the power plant 1, in particular the provision of positive control power. In addition, the effective power 5 of the power plant, in particular, can be reduced for providing negative control power by loading the accumulator 6 with the current generated by the power plant 1 depending on the demand and thus reduce the feeding of current into the power grid. It is also possible to increase the grid load and thus provide negative control power by charging the accumulator 6 with electrical power 7 from the power grid.

Figure 2:
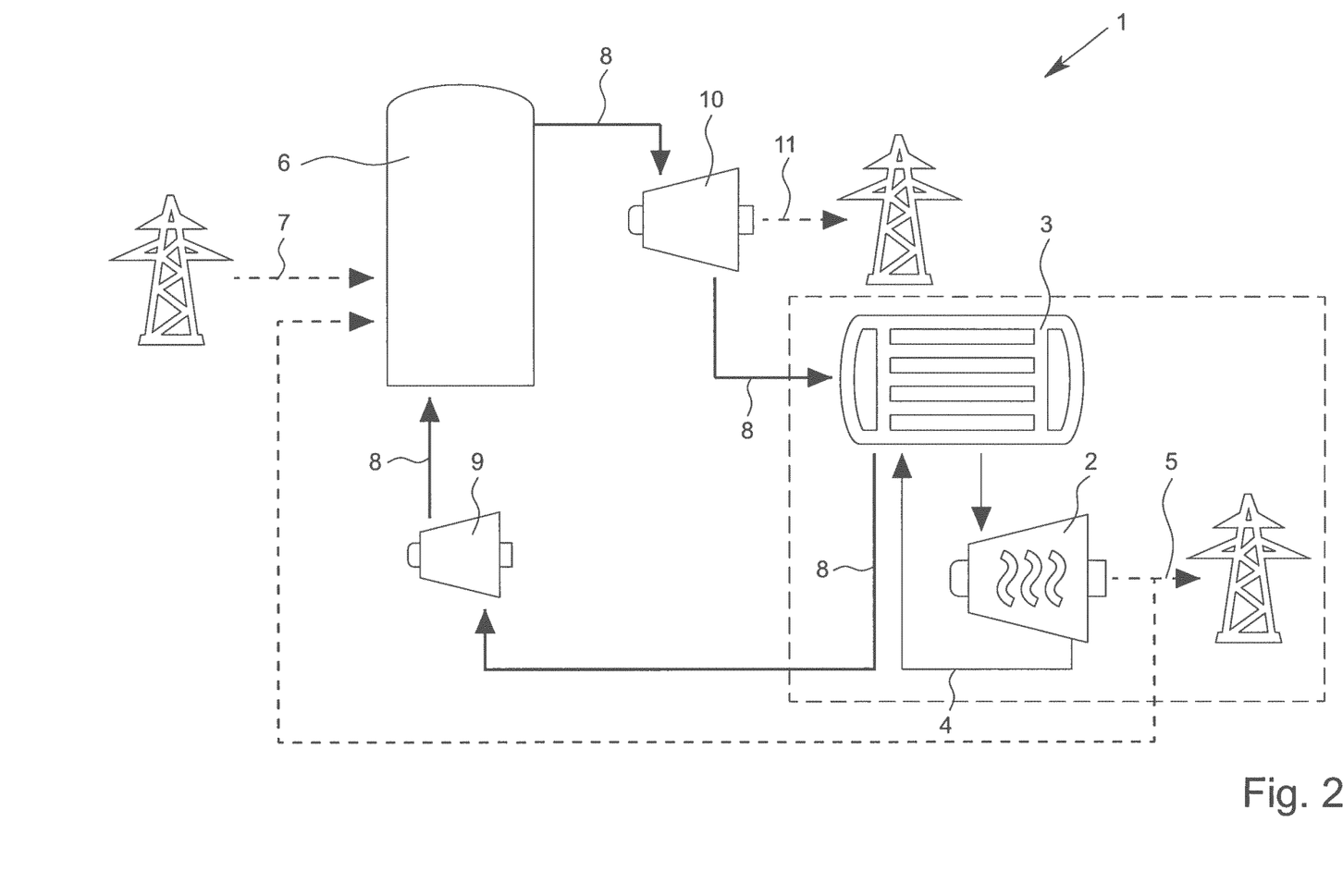
FIG. 2 is a simplified plant diagram of a modified embodiment of the steam turbine power plant shown in FIG. 1, wherein a hot air flow generated during the discharge of the accumulator is expanded prior to the thermal coupling in an expander.

In the power plant 1 shown in FIG. 2, at least one expander 10 is provided for increasing the efficiency and for increasing the flexibility in the power adaptation of the power plant 1, in order to expand the compressed air flow 8, which is heated in the accumulator 6, after the exit from the accumulator 6 and before the heat transfer to the feed water. The electric power 11 generated in this case can be fed into the power grid.

Figure 3:
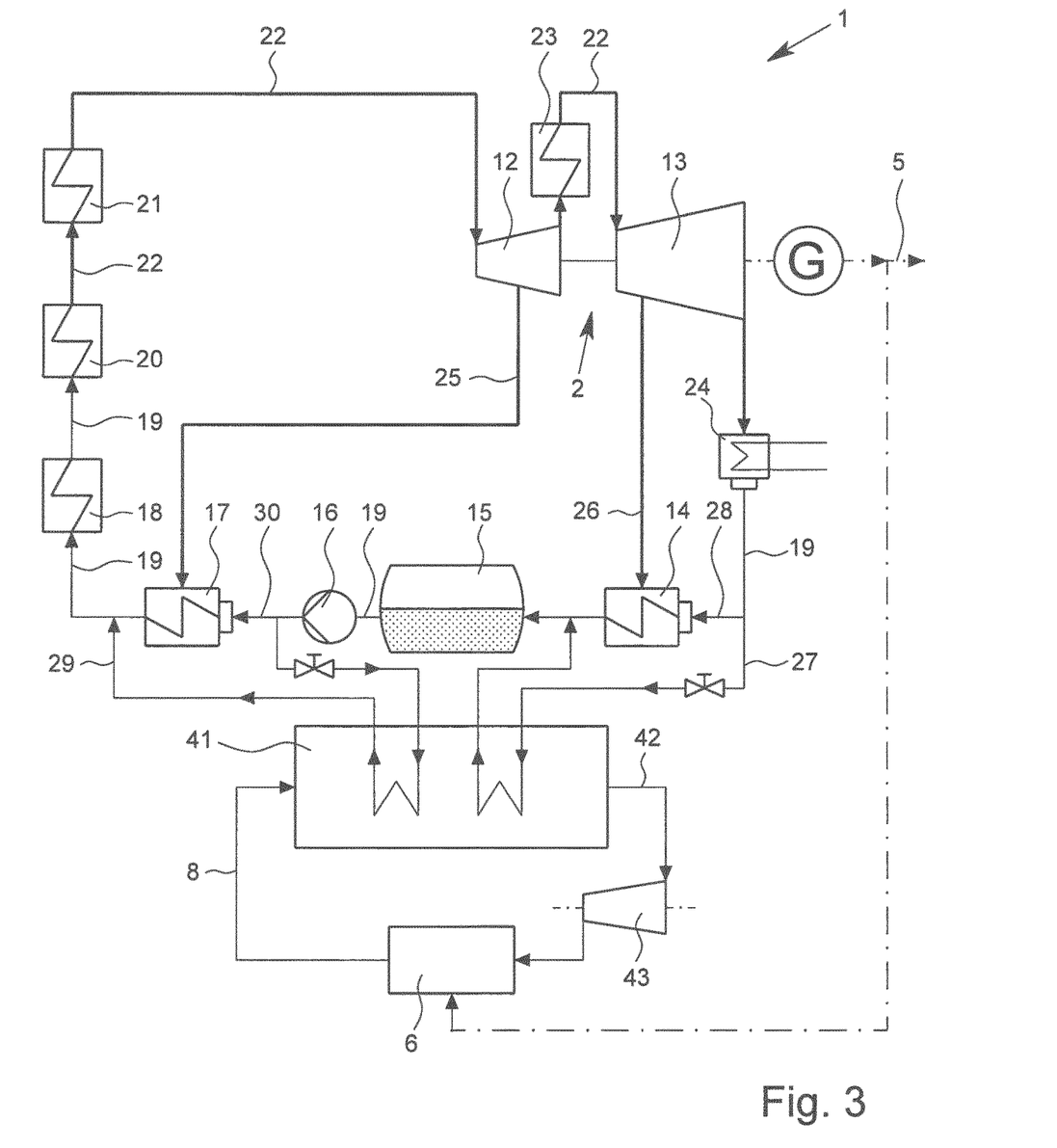
FIG. 3 is a simplified flow diagram of a method according to the invention for the rapid and flexible adaptation of the power of a steam turbine power plant.

FIG. 3 shows a simplified flow diagram of a steam power process for rapid and flexible adaptation of the effective power 5 of a steam turbine power plant 1. It is understood that the power plant 1 can have further plant apparatuses and components (not shown), which are required for implementing the steam power process.

A conventionally operated steam power process is explained below with reference to FIG. 3. The steam power plant 1 has a steam turbine 2 with at least one high-pressure part 12 and at least one middle- and low-pressure part 13. A feed water preheating section 3 of the power plant 1 has at least one low-pressure preheater 14, a feed water tank 15, a pump 16 and at least one high-pressure preheater 17. An economizer 18 is used for further feed water heating. After the preheating, feed water 19 is evaporated in an evaporator 20 and is heated in a superheater 21 in a conventional manner beyond the evaporation temperature. Superheated steam 22 is then first expanded in the high-pressure part 12 of the steam turbine 2 and subsequently heated again in an intermediate superheater 23. The steam 22 is then completely expanded in the middle- and low-pressure part 13 of the steam turbine 2 and condensed in the condenser 24. The feed water 19 formed during the condensation passes into the feed water tank 15 via the low-pressure preheater 14. The feed water 19 from the feed water tank 15 is supplied to the economizer 18 via the high-pressure preheater 17 by means of the pump 16.

In the conventionally operated steam power process, the high-pressure preheater 17 and the low-pressure preheater 14 are heated by removing extraction steam 25, 26 from the high-pressure part 12 and the middle- and low-pressure part 13 of the steam turbine 2. The steam extraction results in a reduction in power of the steam turbine 2. In order to increase the effective power 5 generated by the power plant 1, the condensate build-up method is known from the prior art. In this case, the condensate mass flow through the low-pressure preheater 14 is reduced. As a result, the extraction steam flow rate of the low-pressure preheater 14 can be reduced accordingly, so that more steam 22 remains in the steam turbine 2 and, as a result, more electric power is generated by the steam turbine 2. The higher output made available by the condensate build-up is limited by storage volumes for the condensate flow rate and the maximum steam generator output. In addition, the prior art for increasing the effective power 5 is known, to throttle the extraction steam quantities to the high-pressure preheater 17, wherein, however, high thermal loads of the high-pressure preheater 17 occur. Besides, the boiler furnace must be correspondingly over-dimensioned, since the steam generator 20 in this case receives colder feed water 19.

In order to provide the possibility of achieving a power adaptation of the motor system 1 in a short-term, fast and temporary manner, in particular depending on the requirement, and/or to provide negative grid control power, in the power plant 1 shown in FIG. 3, unlike the conventionally operated steam power process described above, the required heat coupling from an electrically chargeable thermal accumulator 6 is provided. The accumulator 6 can, according to the construction and mode of operation, correspond to the thermal accumulator 6 described with the help of the FIGS. 1 and 2. By means of a bypass, feed water 19 can be guided to the accumulator 6 while bypassing the low-pressure preheater 14 and preheated by heat transfer from the hot air flow 8 heated in the accumulator 6. By means of a further bypass, feed water 19 can be conducted to the accumulator 6 after the pump 16 bypassing the high-pressure preheater 17 and can be further heated there. Subsequently, the heated feed water 19 then passes into the economizer 18. In this case, the system concept shown allows a partial mass flow 27 of the feed water 19 past the low-pressure preheater 14 via the thermal accumulator 8, then to heat and finally to guide it to the feed water tank 15, wherein the remaining part flow rate 28 of the feed water 19 is guided via the low-pressure preheater 14 and is thereby heated. Depending on the storage capacity, the entire feed water flow can also be conducted via the accumulator 6 and can be heated by heat transfer from the hot air stream 8. The same can apply to the high-pressure region of the feed water preheating section 3. A part flow rate 29 of the feed water 19 can be guided via the accumulator 6 to the economizer 18 after the pump 16 past the high-pressure preheater 17, wherein the remaining part flow rate 30 is guided via the high-pressure preheater 17 and is thereby heated. Depending on the storage capacity, the entire feed water flow downstream of the pump 18 can also be guided via the accumulator 6 and thereby heated. Since otherwise large storage capacities are required, it is preferably provided that only the part flow rates 27, 29 of the feed water 19 are guided via the accumulator 6 and are thereby heated.

At least some of the electric power generated by the steam turbine 2 can be used for charging the accumulator 8, so that the effective power 5 of the power plant 1 is reduced. Charging with electrical power from a power grid is also possible. With the system concept shown in FIG. 3, a rapid and flexible change in the effective power 5 of the power plant 1 can be achieved and a high availability of control reserves can be ensured, so that a very economical operation of the power plant can be achieved.

The reaction time for increasing or reducing the effective power 5 of the power plant 1 can be in the range of 5 to 20 seconds. The maximum discharge duration of the accumulator 6 is dependent on the heat storage capacity of the accumulator and can be several hours.

Figure 4:
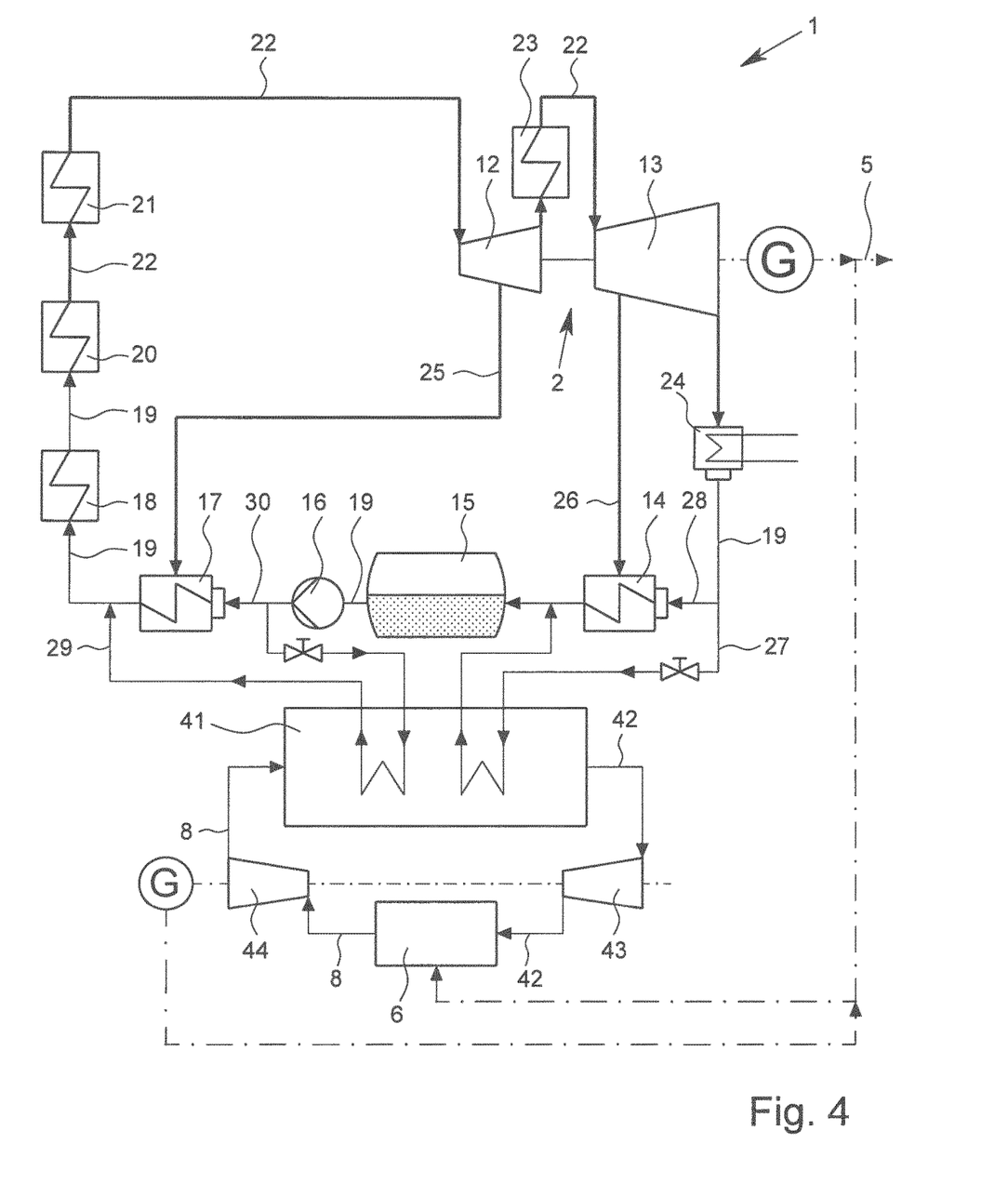
FIG. 4 is a simplified process flow diagram of the process shown in FIG. 3, whereby a flow of hot air generated during the discharge of a thermal store is expanded in an expander before the heat is coupled.

FIG. 4 shows schematically the improvement in the system dynamics of steam turbine power plants using electrically chargeable thermal accumulators for preheating feed water.

Figure 5:
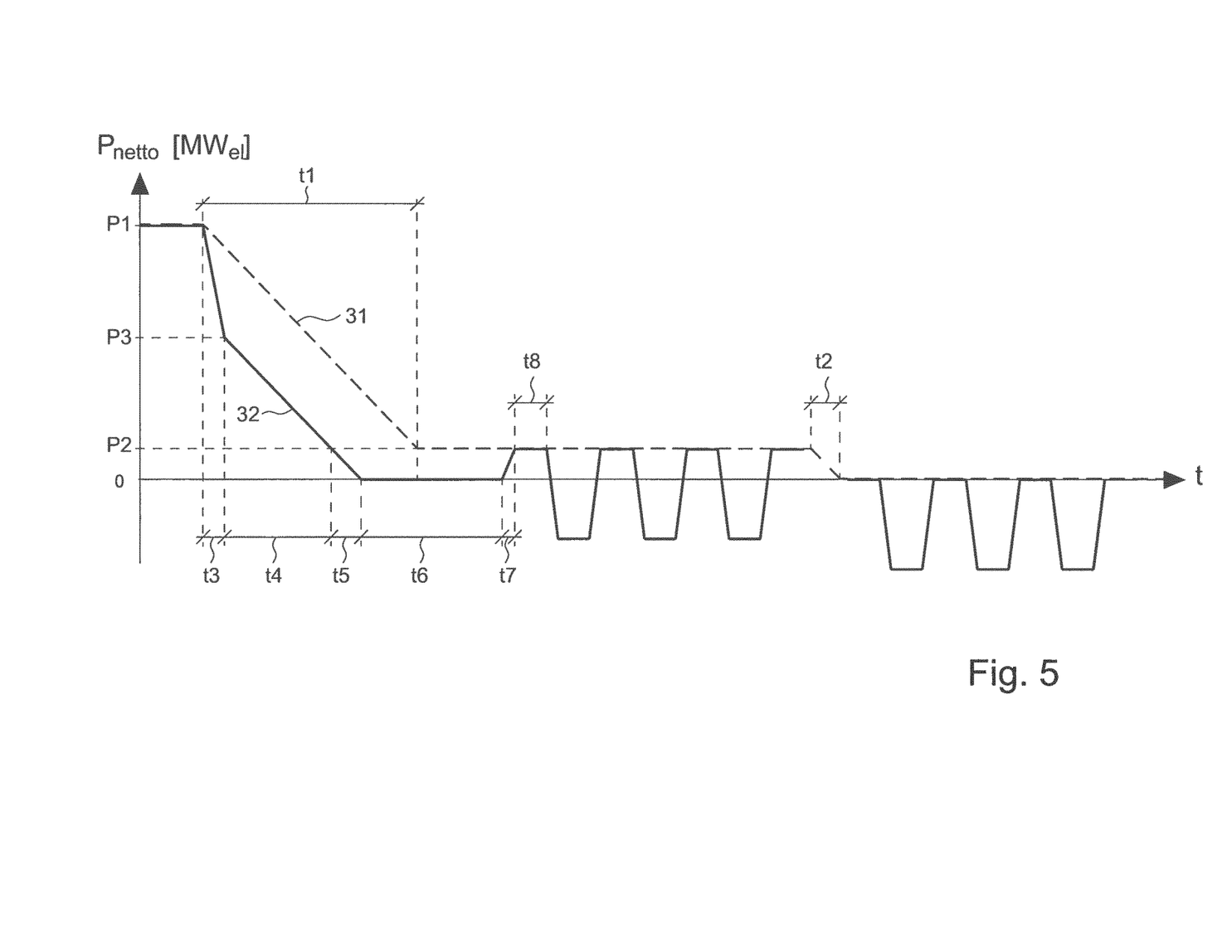
FIG. 5 is a schematic representation of the improvement in the plant dynamics in steam turbine power plants by use of electrically chargeable thermal accumulator for feed water preheating, and FIG. 6 a schematic representation of the improvement in the plant dynamics by use of electrically chargeable thermal accumulators for preheating feed water during the operation of steam turbine power plants close to nominal load.

FIG. 5 shows the power curve 31 of the electrical net power $P_{netto}$ (effective power) of a conventionally operated power plant and the power curve 32 of the electrical net power $P_{netto}$ (effective power) of a modified power plant as a function of different measures for improving the system dynamics, wherein the loading and the discharge of at least one electrically chargeable accumulator as described above is provided as a measure for improving the system dynamics in the modified power plant. The conventional power plant system, on the other hand, can have measures known from the prior art for improving the system dynamics, in particular, condensate accumulation.

The operation of the power plant system in load conditions between the nominal firing power of a power plant furnace or nominal load and the minimum load is illustrated. At nominal load, an effective power P1 is fed into the power grid by the conventionally operated power plant, which corresponds to the nominal power of the power plant. If a power reduction is required, the effective power P1 can be determined, for example, by reducing the condensate mass flow and reducing the firing rate of the steam generator to the effective power P2 over the time period t1, which corresponds to the power of the conventional power plant at minimum load. A further reduction of the effective power of the conventional power plant is only possible by shutting down the power plant, wherein the effective power of the power plant can be reduced to zero from the effective power P2 in the minimum load operation over a period of time t2.

A power reduction of the modified power plant can be achieved by electrical charging of the thermal accumulator over a time period t3, wherein the effective power P1 falls to a reduced effective power P3 solely by means of the current quantity used for charging the accumulator. As can further be seen from FIG. 4, the reduction of the effective power through charging of the accumulator leads to a distinctly faster power reduction in the modified power plant compared to the conventionally operated power plant. A further reduction of the effective power is then possible by reducing the firing power of the steam generator over a period of time t4, until the effective power P2 is reached at minimum load operation.

In addition, the thermal accumulator can also be charged at least partially with electrical energy generated by the power plant during a minimum load operation, so that the effective power of the modified power plant can be reduced further to zero by energizing the accumulator from the effective power P2 over a time period t5. If the minimum load operation is continued, the entire electrical energy generated by the modified power plant is then supplied for charging the accumulator and no current is fed into the power grid, which corresponds to an effective power of zero. The charging of the accumulator with the entire electrical energy generated by the power plant can be maintained over a time period t6 or even longer depending on the storage capacity, wherein the time period t6 can preferably be several hours.

As can be seen from the central region of the power curve 32 of the modified power plant illustrated in FIG. 5, the charging of the thermal accumulator can be stopped as required and thus the effective power of the modified power plant can be increased from zero to the effective power P2, to be precise over a comparatively short time period t7. The power plant can now be operated further at minimum load, for example, over the time period t8 and in this case feed the effective power P2 into the power grid. By changing the loading capacity of the thermal accumulator, the effective power can easily be adapted quickly to the instantaneous demand for grid control power. In this case, preferably zero to 100% of the power plant power can be used for charging the thermal accumulator in the case of minimum load operation, so that a demand-oriented adaptation of the effective power over a large power range is possible.

As can be seen from FIG. 5, the maximum loading capacity of the thermal accumulator can also be greater than the power plant power at minimum load operation, so that the thermal accumulator can be charged with electrical energy from the interconnected power grid, in particular, to provide additional grid control power. During the minimum load operation of the modified power plant, it is thus possible to provide more negative control power, which is schematically shown in FIG. 5 by negative values for the power curve 32 of the modified power plant.

In addition, after the modified power plant has been shut down, the electrical charge of the thermal accumulator can be continued with current from the power grid, so that negative control power can continue to be supplied.

Figure 6:
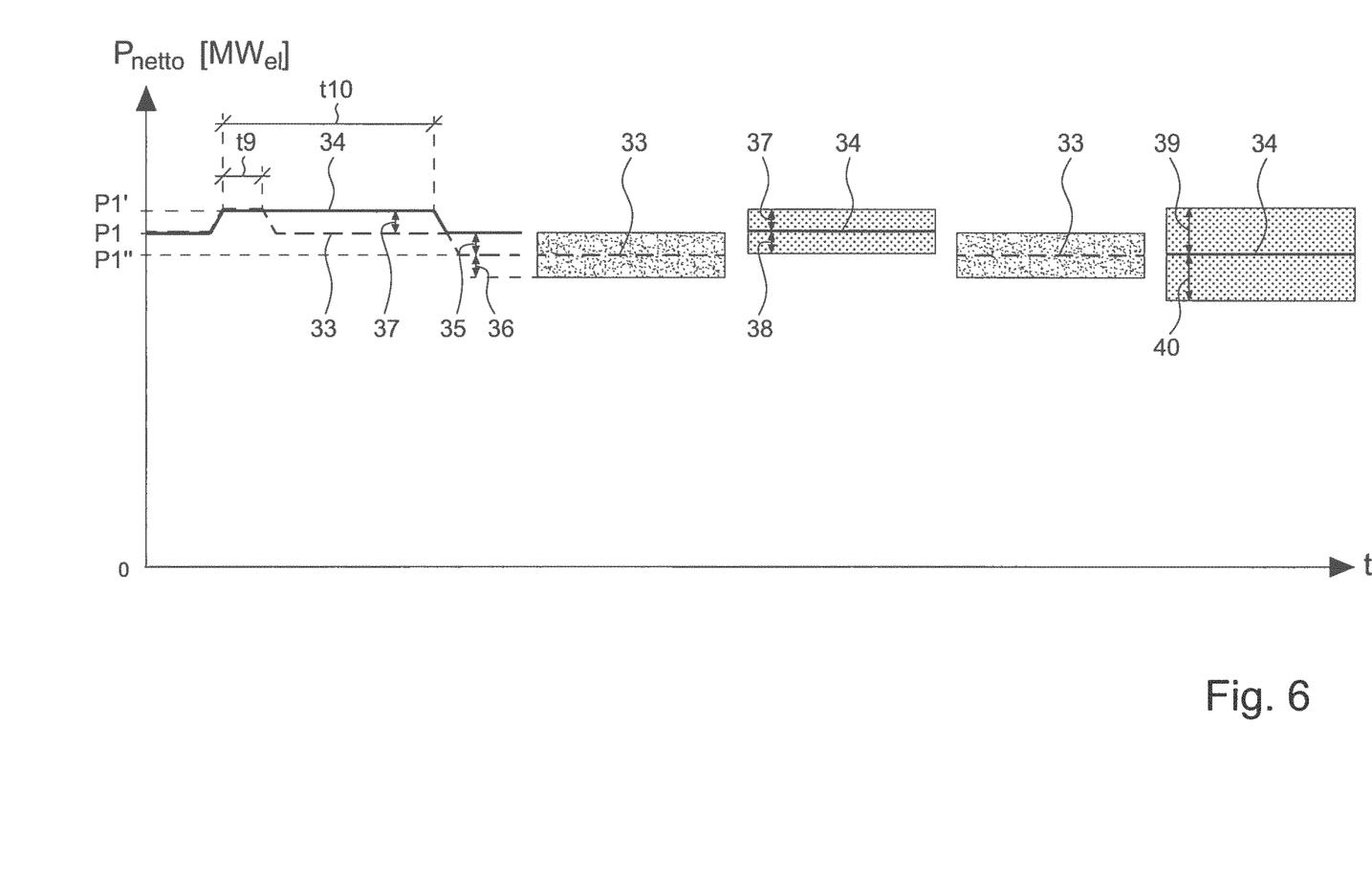

FIG. 6 shows schematically the possibility for power adaptation of the electrical net power $P_{netto}$ (effective power) in a conventionally operated steam turbine power plant by means of a build-up of condensate (power curve 33) and in a modified steam turbine power plant by coupling to an electrically chargeable thermal accumulator (power curve 34).

In the case of nominal load operation of the conventionally operated power plant, the condensate build-up method makes it possible to increase the effective power from the nominal power P1 to the power P1' for a comparatively short time period t9, wherein the time period t9 does not exceed the range of a few minutes in the usual power plant design. The power increase can amount to approximately 10% of the nominal power P1. A corresponding power reduction from the nominal power P1 to the reduced power P1' is possible by means of other fast-acting measures for providing power changes, like for example, the throttling of the high-pressure turbine control valves. In order to provide a positive control reserve over a longer period of time, conventional power plants must usually be operated below the nominal furnace capacity, for example at the reduced power output P1'.

The measures provided with the positive and negative control reserves achievable in conventionally operated power plants for improving the system dynamics are indicated schematically in FIG. 6 by the arrows 35, 36.

Due to the thermal coupling from an electrically chargeable thermal accumulator into the feed water heater section, the modified power plant can be operated over a significantly longer period of time t10, which can be of several hours, at an effective power P1' above the effective power P1 achievable in nominal load operation. The increase in power output by coupling heat from the thermal accumulator can correspond to the increase in power due to condensate accumulation in conventional power plants or can also be above it. In the same order of magnitude, the effective power P1 of the power plant can be reduced by charging the thermal accumulator with electrical energy generated in the power plant process. This is schematically shown in FIG. 6 by the arrows 37, 38. As a result, the operating point of the modified power plant can be increased relative to the operating point of conventionally operated power plants, wherein the same control power range can be offered.

Alternatively, it is possible to offer a wider control power range, when the operating point of the modified power plant is lowered accordingly to the operating point of the conventionally operated power plant. This possibility is schematically represented in FIG. 5 by the arrows 39, 40.

The invention claimed is:

1. A method for quick and flexible adaptation of the power of a steam turbine power plant, comprising:
    providing a steam turbine having a high-pressure part, a medium-pressure part, and a low-pressure part;
    providing a feed water preheater section in communication with the steam turbine;
    providing an electrically chargeable thermal accumulator that is configured to communicate with the feed water preheater section and to increase the temperature flowing through the feed water preheater section;
    wherein the steam turbine is configured to provide power to a power grid and to communicate steam back to the feed water preheater section; and
    selectively heating the accumulator while the accumulator is discharging heated air to the feed water preheater section.

2. The method according to claim 1, further comprising steam tapping of the steam turbine, wherein heat input from the accumulator is reduced or stopped.

3. The method according to claim 1, wherein the feed water preheater section comprises at least one feed water preheater, and wherein a bypass line is provided that is configured to direct steam extracted from the steam turbine directly to the accumulator.

4. The method according to claim 1, wherein during the discharge of the accumulator, the released thermal energy is coupled primarily into the high-pressure region of the feed-water preheating section.

5. The method according to claim 1, further comprising charging the accumulator as required with electrical energy generated by the power plant.

6. The method according to claim 1, further comprising charging the accumulator with electrical energy from a power grid.

7. The method according to claim 1, operating the power plant at nominal load or in the range between nominal load and minimum load, and at least partially discharging the accumulator to provide positive control power, and is at least partially charged to provide negative control power.

8. The method according claim 1, further comprising charging the accumulator during a minimum load operation of the power plant at least partially with electrical energy generated by the power plant to provide negative control power.

9. The method according to claim 8, wherein net power of the power plant when operating at minimum load operation is adapted to the demand of grid control power by changing the loading capacity of the accumulator.

10. The method according to claim 1, wherein loading capacity of the accumulator corresponds to at least the power plant power output at minimum load operation.

11. The method according to claim 1, wherein loading capacity of the accumulator is greater than the power level at minimum load operation, and the accumulator is charged with electrical energy from an interconnected power grid.

12. The method according to claim 1, wherein after power plant shut down, the accumulator is charged with electrical energy from a power grid.

13. The method according to claim 1, wherein thermal energy is transferred during the discharge of the accumulator to a compressed air flow, and the compressed air flow is expanded to provide additional control power before subsequent heat coupling into the feed water preheating section.

14. A steam turbine power plant having at least one steam turbine configured to carry out the method according to claim 1, wherein heat released during the discharge of the accumulator is introduced into a feed water preheating section of the power plant for heating the feed water.

15. The power plant according to claim 14, wherein the feed water preheating section has at least one feed water preheater, that can be heated with extraction steam of the steam turbine, and further comprising at least a partially feed-water-side bypass line that directs feed water directly to the feed water preheater section past the feed water preheater.

16. The method according to claim 1, operating the steam turbine power plant at nominal load or in the range between nominal load and minimum load, and at least partially charging the accumulator to provide negative control power.

* * * * *